(12) United States Patent
Tanahashi et al.

(10) Patent No.: US 6,189,602 B1
(45) Date of Patent: Feb. 20, 2001

(54) ELECTRONIC DEVICE WITH IMPROVED HEAT DISSIPATION

(75) Inventors: Makoto Tanahashi, Kanagawa; Tsutomu Asawa, Nagano; Mitsuru Ichikawa, Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 09/159,747

(22) Filed: Sep. 23, 1998

(30) Foreign Application Priority Data

Sep. 25, 1997 (JP) .................................................. 9-260046

(51) Int. Cl.[7] ..................................................... F28D 11/00
(52) U.S. Cl. ..................... 165/86; 165/104.33; 165/185; 361/687; 361/700; 174/15.2
(58) Field of Search .................... 165/86, 104.33, 165/104.26, 185; 361/687, 700; 174/15.2

(56) References Cited

U.S. PATENT DOCUMENTS

| | | | |
|---|---|---|---|
| 5,549,155 | * 8/1996 | Meyer, IV et al. | 165/104.33 |
| 5,588,483 | * 12/1996 | Ishida | 165/104.33 |
| 5,621,613 | * 4/1997 | Haley et al. | 165/104.33 |
| 5,646,822 | * 7/1997 | Bhatia et al. | 165/104.33 |
| 5,718,282 | * 2/1998 | Bhatia et al. | 165/104.33 |
| 5,796,581 | * 8/1998 | Mok | 165/104.33 |
| 5,826,645 | * 10/1998 | Meyer, IV et al. | 165/104.33 |
| 5,847,925 | * 12/1998 | Progl et al. | 165/104.33 |
| 5,872,699 | * 2/1999 | Nishii et al. | 165/104.33 |
| 5,880,929 | * 3/1999 | Bhatia | 165/104.33 |

* cited by examiner

Primary Examiner—Ira S. Lazarus
Assistant Examiner—Terrell McKinnon
(74) Attorney, Agent, or Firm—Frommer, Lawrence & Haug, LLP; William S. Frommer; Matthew K. Ryan

(57) ABSTRACT

A portable electronic device such as a portable personal computer has a first part such as a main unit incorporating a heat-generating component, e.g., a CPU, a second part such as a display unit, and a connector for pivotally connecting the first and second parts. The connector includes hinges that provide mechanical connection between the first and the second parts, while conducting heat from the heat-generating component in the first part to the second part, so that the heat is dissipated from the second part. The electronic device this has enhanced heat dissipation without being required to have a greater size.

8 Claims, 14 Drawing Sheets

FIG. 11

| | HINGE OF EMBODIMENT | |
|---|---|---|
| | FIXED PART | MOVABLE PART |
| 0 sec | 27 | 27 |
| 15 sec | 29 | 27 |
| 30 sec | 30 | 28 |
| 60 sec | 32 | 30 |
| 90 sec | 32 | 31 |
| 120 sec | 34 | 32 |
| 180 sec | 37 | 35 |

FIG. 12

| | CONVENTIONAL HINGE | |
|---|---|---|
| | FIXED PART | MOVABLE PART |
| 0 sec | 26 | 26 |
| 15 sec | 31 | 26 |
| 30 sec | 35 | 26 |
| 60 sec | 39 | 27 |
| 90 sec | 43 | 27 |
| 120 sec | 47 | 28 |
| 180 sec | 50 | 29 |

FIG. 13

| PHYSICAL CONSTANTS OF HEAT -CONDUCTIVE MATERIALS AT 0°C (UNIT : W/mK) ||
|---|---|
| SILVER | : 428 |
| COPPER | : 403 |
| GOLD | : 319 |
| ALUMINUM | : 236 |
| MAGNESIUM | : 157 |
| IRON | : 83.5 |
| 18-8 STAINLESS STEEL | : 15 |

ELECTRONIC DEVICE WITH IMPROVED HEAT DISSIPATION

BACKGROUND OF THE INVENTION

1. Field of the Invention

The present invention generally relates to electronic devices and more particularly relates to an electronic device such as a portable computer.

2. Description of the Related Art

Many types of portable electronic devices such as portable computers are recently commercially available, including those incorporating central processing units (CPUs). Such electronic devices consume substantial electrical power, and hence generate heat that must be dissipated.

Certain types of portable electronic devices such as portable computers have a basic structure composed primarily of a main unit and a display unit hinged to the main unit. Such a basic structure is typical for A-4-size notebook personal computers (PCs) and mini-notebook PCs of, for example, B-5 size.

The above hinge is typically a mechanical hinge having a fixed part and a movable part that is pivotally and mechanically connected to the fixed part. The movable part is pivotally swung towards and away from the fixed part when a certain amount of torque is applied to act about the axis of the pivotal connection. Conventionally, selection of materials for the fixed and movable parts has been made primarily based on mechanical strength, without giving specific consideration to conduction of heat to be dissipated.

Measures conventionally employed for enhancing heat dissipation are broadly classified into two types: use of a large heat sink which naturally radiates heat, and forced air-cooling by means of a fan.

Heat dissipation relying upon natural heat radiation from a heat sink, however, is limited due to the restricted space available for the heat sink. Forced air-cooling by a fan also has drawbacks such as generation of noise from the fan and greater power consumption due to driving of the fan.

SUMMARY OF THE INVENTION

Accordingly, it is an object of the present invention to provide an electronic device that rapidly dissipates heat without requiring increase in size.

To this end, according to the present invention, there is provided an electronic device that comprises: a first part containing a heat source; a second part connected to the first part; and pivotal connecting means for mechanically and pivotally connecting the second part to the first part so as to allow the second part to pivot on the first part between a closed position and an open position and for transmitting heat from the heat source to the second part.

Thus, the electronic device has pivotal connecting means that pivotally connects the second part to the first part and that transmits heat from the heat source inside the first part to the second part. With this arrangement, transfer of heat from the heat source inside the first part to the second part is promoted by virtue of the heat-transmitting pivotal connecting means, whereby heat dissipation is achieved without requiring any increase in the size of the electronic device.

Preferably, the first part has a heat pipe that conducts heat from the heat source to the pivotal connecting means. Such a heat pipe ensures heat conduction to the pivotal connecting means from the heat source even when the heat source is spaced a large distance from the pivotal connecting means. Alternatively, the heat source may be disposed in the vicinity of the pivotal connecting means, so that heat is conducted to the pivotal connecting means without the aid of such a heat pipe.

It is also preferred that the second part has a heat diffusion member thermally connected to the pivotal connecting means so that heat can be diffused and dissipated through the heat diffusion member.

The heat diffusion member may be disposed in a casing that is a constituent of the second part and that encases other constituents of the second part. Alternatively, the second part has a metallic casing that serves as the heat diffusion member.

Preferably but not exclusively, the first part comprises a main unit of a portable computer and the second part comprises a display unit of the portable computer. In such a case, either or both the central processing unit and a power supply unit serve as the heat source.

The above and other objects, features, and advantages of the present invention will be clear from the following descriptions of preferred embodiments taken in conjunction with the accompanying drawings.

BRIEF DESCRIPTION OF THE DRAWINGS

FIG. 11 is a table showing changes in temperatures over time measured at the fixed part and the movable part of a hinge structure incorporated in the embodiment of the present invention;

FIG. 12 is a table showing changes in temperatures over time measured at the fixed part and the movable part of a conventional hinge structure;

FIG. 13 is a table showing physical constants of heat-conductive materials usable as the materials of fixed and movable hinge pieces of the hinge structure;

DESCRIPTION OF THE PREFERRED EMBODIMENT

A preferred embodiment of the present invention will be described with reference to the accompanying drawings. It is to be understood, however, the embodiment shown below is not exclusive, and various technical matters specified in the specification are introduced solely for the purpose of illustration, unless otherwise indicated.

Figure 1:
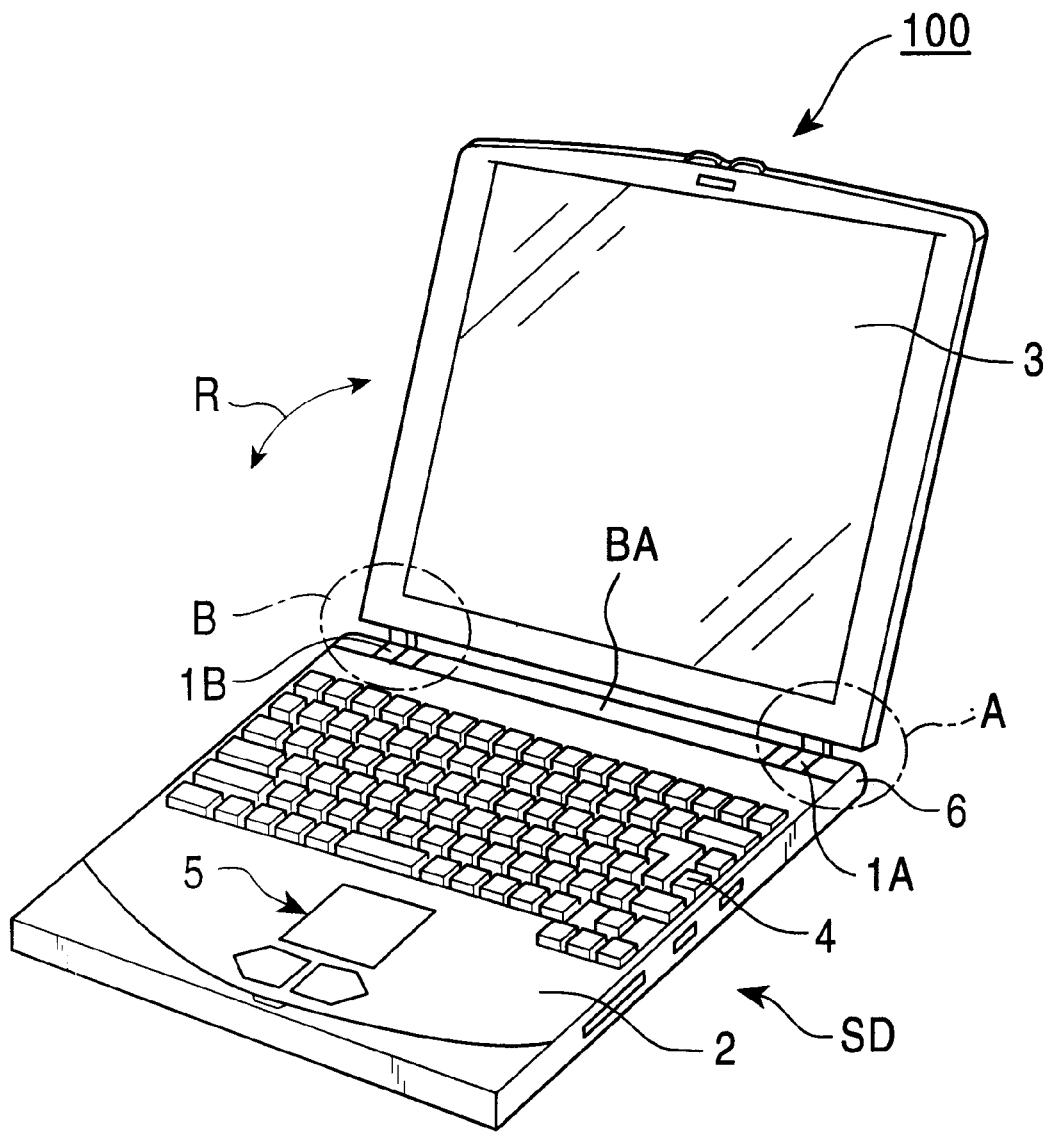
FIG. 1 is a perspective view of an electronic device as an embodiment of the present invention.

Referring to FIG. 1, a portable computer as an embodiment of the electronic device of the invention, having a unique hinge structure, is generally denoted by 100. The portable computer 100 has a main unit 2, a display unit 3, a keyboard 4, hinges 1A, 1B as demarcated by chain-line circles, and so forth.

The main unit 2 has, in addition to the keyboard 4, various components and circuits, as well as a pointing device 5. The display unit 3 may be a liquid crystal display unit (referred to also as "LCD"). The display unit 3 is pivotally connected, i.e., hinged, at its one end to the adjacent end of the main unit 2 by means of the hinges 1A, 1B so as to pivot towards and away from the main unit 2 as indicated by a double-headed arrow R. Thus, the portable computer 100 is "foldable". Although not shown, structures for connection to an external pointing device such as a mouse, a battery power pack as an external power supply and so forth may be provided on the main unit 2.

Figure 2:
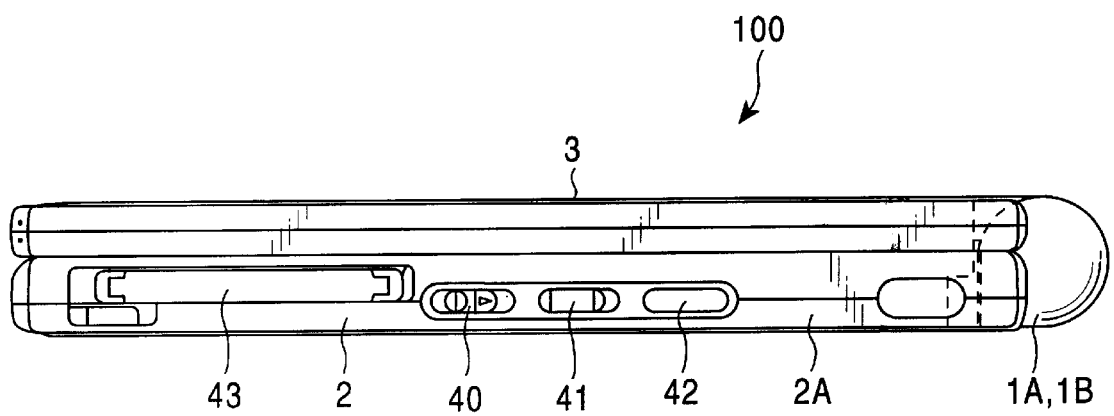
FIG. 2 is a side elevational view of a computer as an example of the electronic device.

FIG. 2 shows the electronic device of FIG. 1 in the folded state with the display unit laid down on the main unit 2, as viewed in the direction of the arrow SD of FIG. 1. It will be seen that a power switch 40 and other switches 41, 42 are disposed on one lateral side surface 2A of the main unit 2. A slot 43 for receiving an electronic card, e.g., an extending accessory such as a PC card, is provided in the same side surface 2A.

Figure 3:
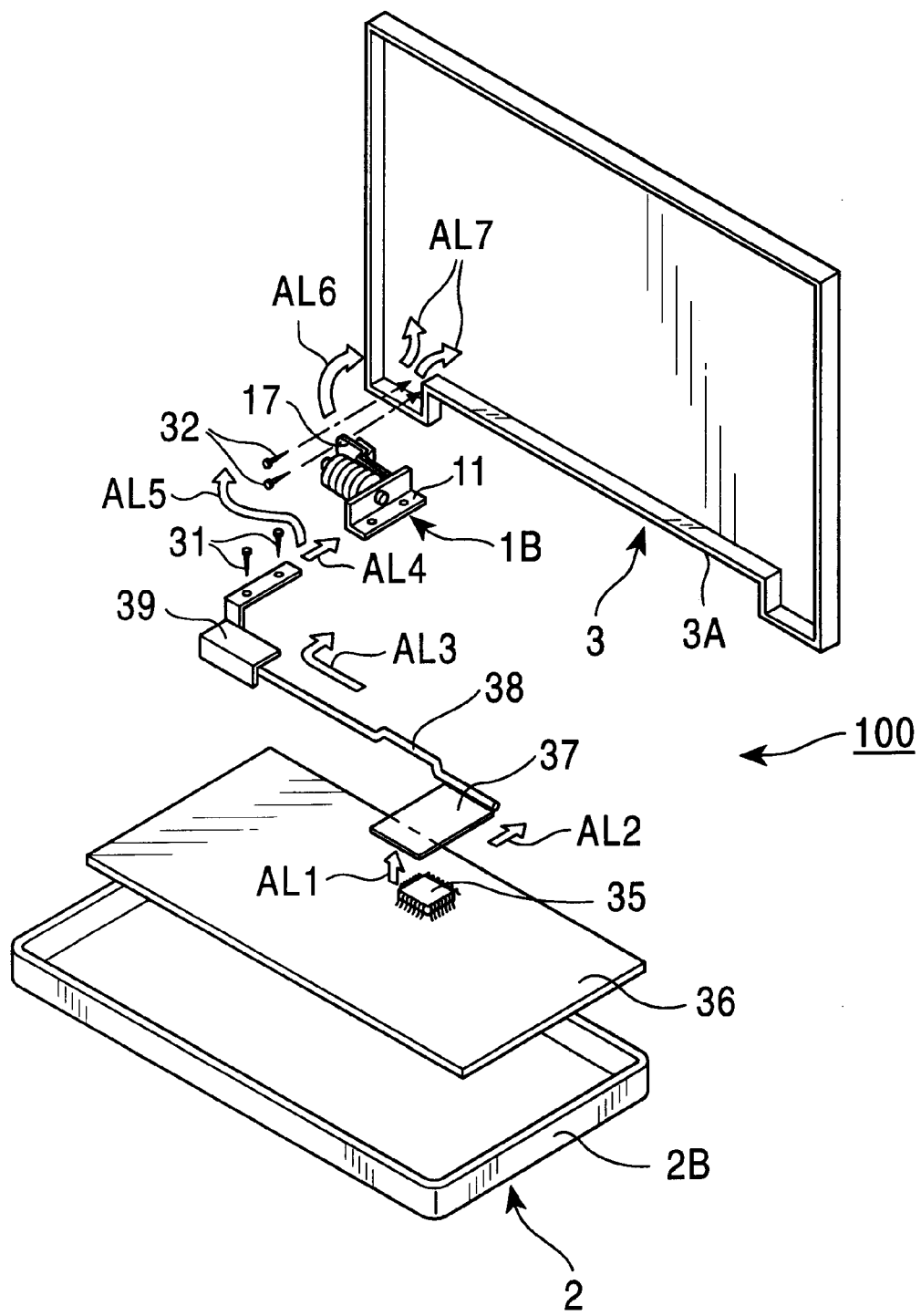
FIG. 3 is a perspective view of the computer of FIG. 2, showing particularly a main unit, display unit and a hinge structure for thermal conduction and mechanical connection between the main unit and the display unit.
Figure 4:
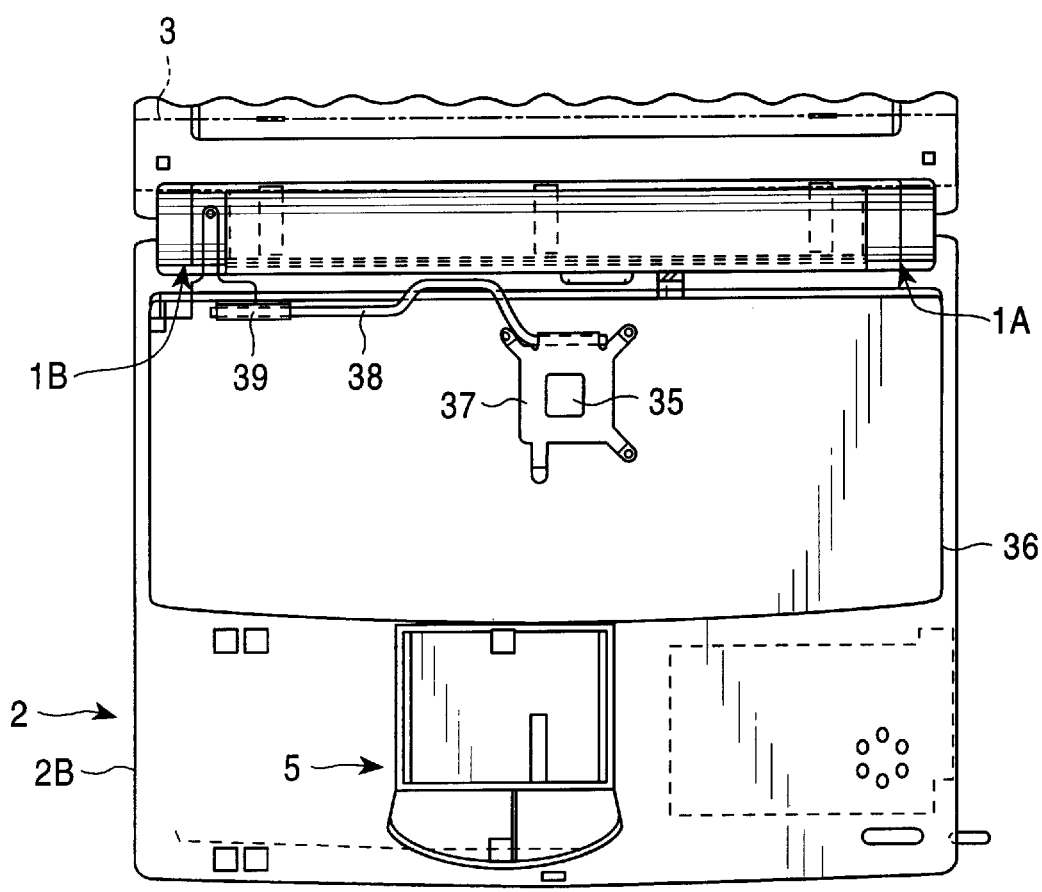
FIG. 4 is a plan view of the main unit of the computer shown in FIG. 2.

FIGS. 3 and 4 generally show critical portions of the electronic device of the invention, including a central processing unit (referred to also as "CPU") 35, a casing 2B of the main unit 2, one 1B of the hinges and a casing 3A of the display unit 3. Referring particularly to FIG. 3, heat generated by the CPU 35 that is a source of heat is transmitted to the casing 3A of the display unit 3 via a substrate 36 carrying the CPU 35, and the hinges (only the hinge 1B is shown). The heat is then dissipated from or diffused through the casing 3A.

More specifically, the CPU 35 is mounted on the substrate 36 encased by the casing 2B. The casing 2B is hinged to the casing 3A by means of the hinges 1A (not shown) and 1B, so that path of transmission of heat from the CPU 35 is formed between the casing 2B inclusive of the substrate 36 and the casing 3A by way of the hinges 1A, 1B.

In the arrangement shown in FIGS. 3 and 4, the CPU 35 is located substantially at the center of the substrate 36, at a fairly large distance from the hinge 1B. In this embodiment, therefore, a path of heat constituted by a heat receptacle plate 37 for receiving the heat from the CPU 35, a heat pipe 38 and a connector 39 is provided between the hinge 1B and the CPU 35. The heat receptacle plate 37 is placed on or above the CPU 35 with or without a predetermined gap formed therebetween. The heat receptacle plate 37 is connected to the connector 39 through the heat pipe 38. The heat pipe 38 and the heat receptacle plate 37 may be made of a highly heat-conductive metal such as copper, aluminum or the like. The heat-receptacle plate 37 has a size considerably greater than that of the CPU 35.

The connector 39 also may be made of a highly heat-conductive material such as copper and aluminum, and is fixed to the casing 2B of the main unit 2 with a fixed hinge piece 11 of the hinge 1B placed therebetween, by means of small screws 31. The counterpart, i.e., a movable hinge piece 17, of the hinge 1B is fixed to the inner surface of the casing 3A by means of small screws 32. As will be described later, the hinge 1B is configured to achieve high efficiency of heat transmission from the fixed hinge piece 11 to the movable hinge piece 17.

Referring now to FIG. 4, it will be seen that the CPU 35 is disposed at the center of the substrate 36 mounted in the casing 2B of the main unit 2. It will be seen also that a series connection of the heat receptacle plate 37 and the heat pipe 38 is provided between the CPU 35 and the connector 39.

A description will now be given of the manner in which heat generated by the CPU 35 is transmitted to the casing 3A.

The CPU 35 when activated generates heat. The heat is received by the heat receptacle plate 37 as indicated by the arrow AL1. The heat is then conducted to the fixed hinge piece 11 of the hinge 1B via the heat pipe 38 and the connector 39, as indicated by arrows AL2, AL3 and AL4. The heat is then transmitted from the fixed hinge piece 11 of the hinge B to the movable hinge piece 17 of the same as indicated by the arrow AL5 and is then transmitted to the casing 3A as shown by the arrow AL6. The heat is then dissipated from or diffused through the casing 3A as indicated by the arrow AL7.

Although the display unit 3 itself generates heat, rate of heat generation is much smaller in the display unit 3 than in the main unit 2. Thus, heat is conducted from the main unit 2 that generates heat at a greater rate to the display unit 3 that generates heat at a smaller rate, whereby heat is diffused through and dissipated from the display unit 3 without being accumulated in the main unit 2 of the computer 100. It is thus possible to easily dissipate heat, simply by using the hinge structure proposed by the invention, without using specific means such as a heat sink or a fan.

Although heat conduction through one of the hinges 1B alone has been described with reference to FIG. 3, both the hinges 1A and 1B may obviously take part in the heat conduction.

The casing 2B of the main part 2 will also be referred to as a "bottom cabinet", while the casing 3A of the display unit sometimes is referred to as an "outer cabinet". The substrate 36 also is referred to as a "main substrate".

A description will now be given of a practical construction of the hinges 1A and 1B.

The hinges 1A, 1B serve to mechanically connect the display unit 3 to the distal end 6 of the main unit 2, while achieving thermal conduction between these units to enhance heat dissipation.

The hinges 1A and 1B are arranged and configured in symmetry with each other with respect to the bisector line that extends from the proximal end to the distal end of the main unit 2. The constructions of these hinges, however, are materially the same. Therefore, the construction and other features of the hinge will be described with reference to FIGS. 5 to 9 which show the hinge 1A by way of representative.

Figure 5:
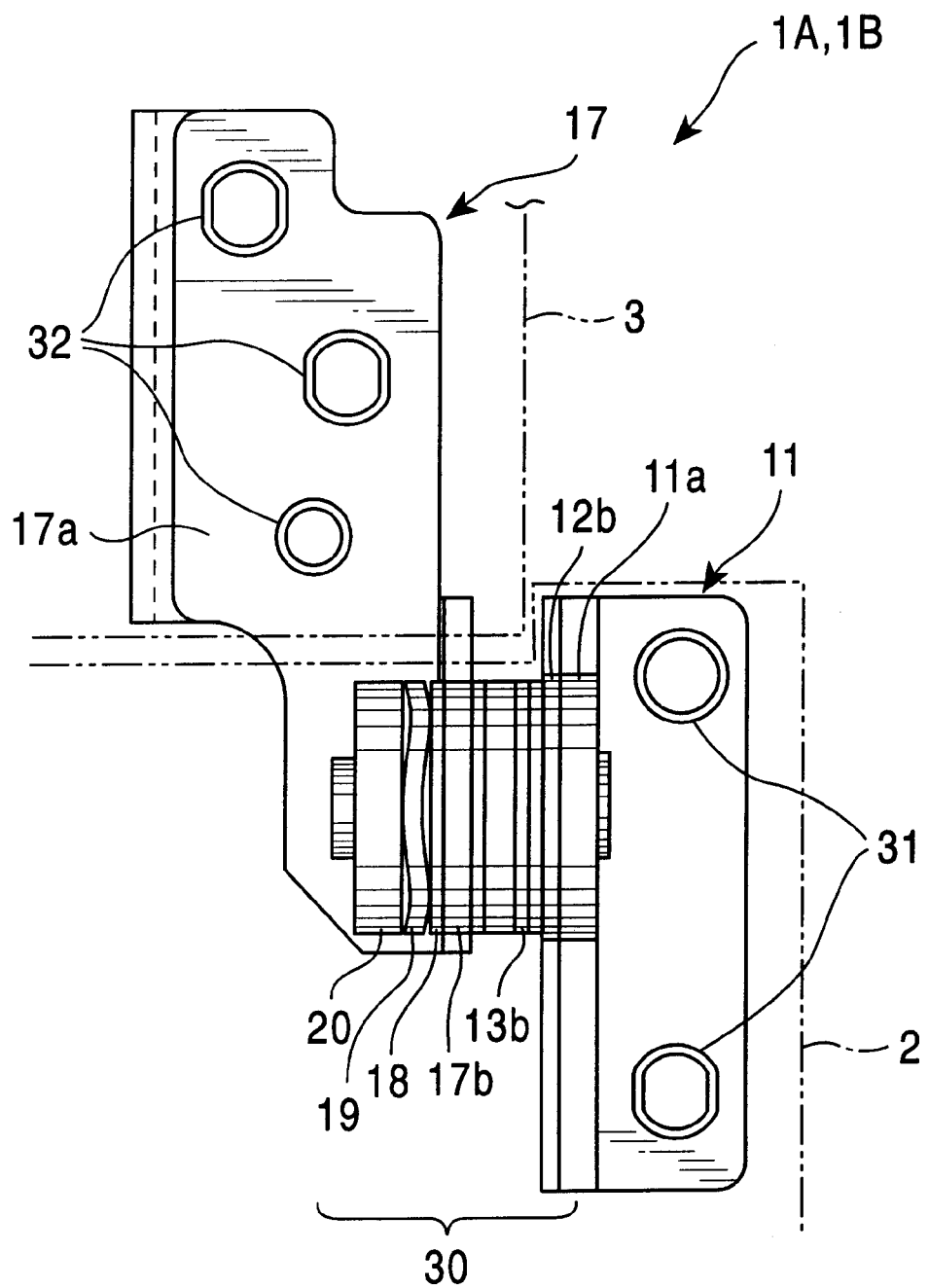
FIG. 5 is a plan view of a preferred form of a hinge structure incorporated in the electronic device of FIG. 1.
Figure 6:
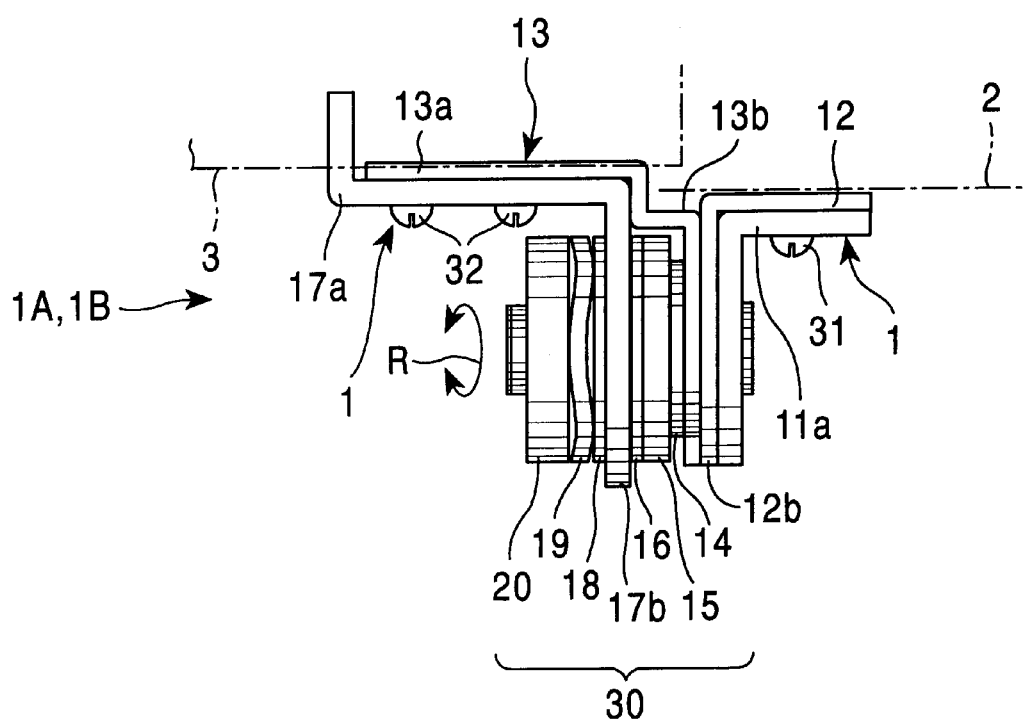
FIG. 6 is a side elevational view of the hinge structure.

As will be seen from FIGS. 5 and 6, the hinge 1A has a fixed hinge piece 11, a movable hinge piece 17 and a connecting structure 30. As will be seen from FIGS. 7 to 9, the connecting structure 30 mechanically interconnects the stationary piece 11 and the movable hinge piece 17 while providing heat conduction therebetween.

The fixed hinge piece 11 has a backup portion 11a that provides mechanical strength and a heat-conductive portion 12 that serves as a heat conductor. In order to provide mechanical strength large enough to withstand any force acting on the fixed hinge piece 11 when the display unit 3 of FIG. 1 is swung up and down, the backup portion 11a is made of a material having large mechanical strength such as an iron-based material, e.g., a stainless steel (SUS). Thus, the backup portion 11a is formed by bending a tabular member of the material having high mechanical strength, so as to exhibit an L-shaped section as shown in FIG. 6.

On the other hand, the heat-conductive portion 12 is preferably made of a material having high heat conductivity such as copper-based materials or aluminum. The heat-conductive portion 12 also is formed by bending a sheet-like member to have a substantially L-shaped section as viewed in FIG. 6. Thus, the backup portion 11a closely fits the heat-conductive portion 12 and is bonded or otherwise fixed thereto.

Thus, the fixed hinge piece 11 is composed of the backup portion 11a and the heat-conductive portion 12 which are materially integrated with each other. This fixed hinge piece 11 is secured to the mounting surface of the main unit 2 by means of, for example, small screws 31.

Figure 7:
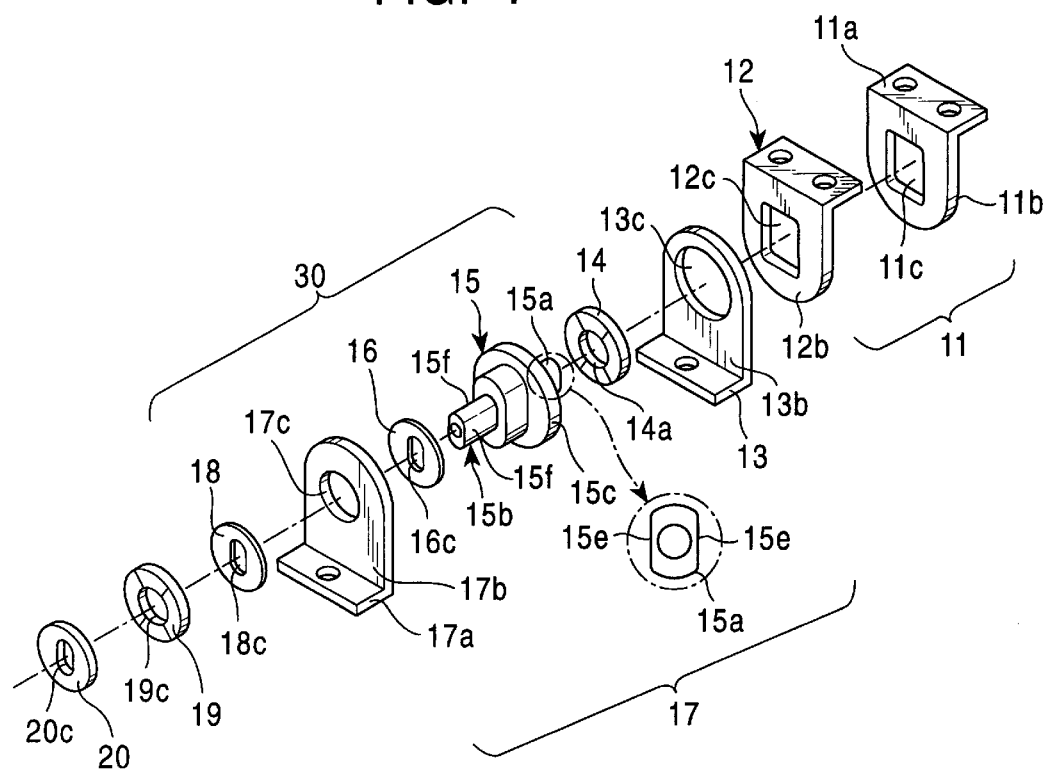
FIG. 7 is an exploded perspective view of the hinge structure shown in FIGS. 5 and 6.
Figure 8:
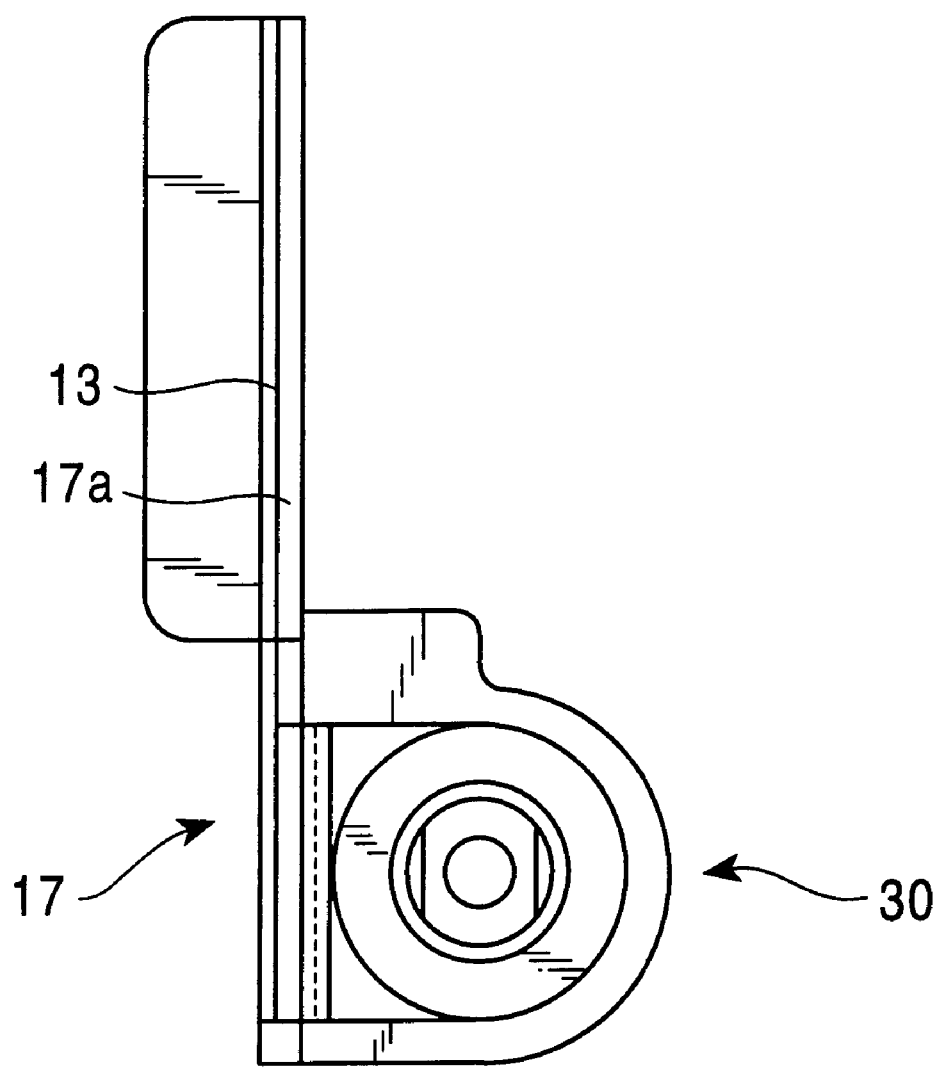
FIG. 8 is a side elevational view of the hinge structure shown in FIG. 5.
Figure 9:
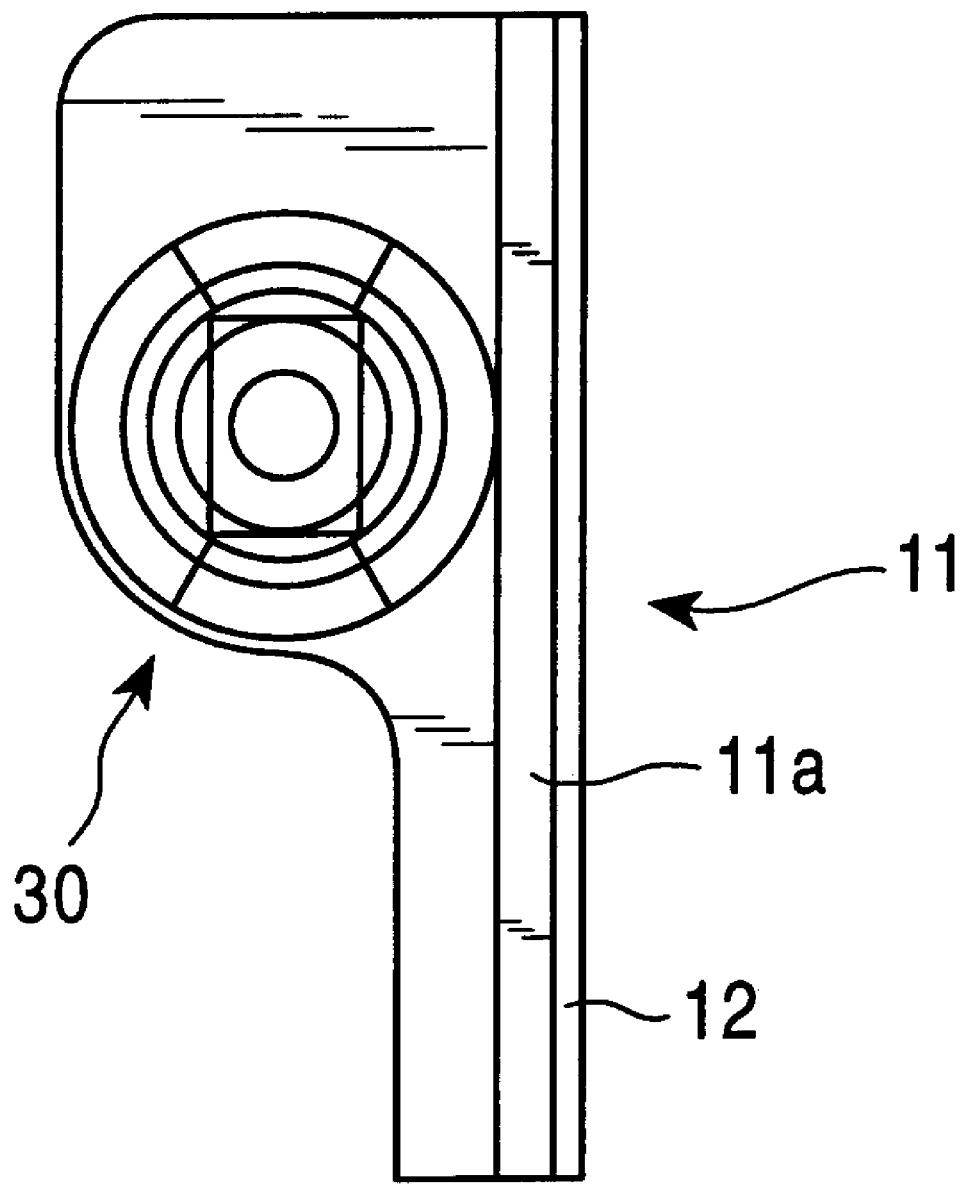
FIG. 9 is another side elevational view of the hinge structure shown in FIG. 5.

FIG. 7 is an exploded perspective view of the hinge 1A, sowing configurations of the backup portion 11a and the heat-conductive portion 12 by way of example. The backup portion 11a has a web portion 11b having a rectangular hole 11c formed therein. Likewise, the heat-conductive portion 12 has a web portion 12b having a hole 12c formed therein.

A description will now be given of the movable hinge piece 17 that serves as the counterpart of the fixed hinge piece 11. As will be seen from FIGS. 5 to 7, the movable hinge piece 17 has a backup portion 17a and a heat-conductive portion 13. The backup portion 17a provides required mechanical strength, while the heat-conductive portion serves as a heat conductor. In order to sustain any force applied to the hinge 1A during swinging motion of the display unit 3, as well as to hold the rigidity of the pivotal connection, the backup portion 17a is preferably made of a material having a large mechanical strength such as an iron-based material, e.g., a stainless steel (SUS).

On the other hand, the heat-conductive portion 13 is made of a material having high heat conductivity such as a copper-based material or aluminum. Both the backup portion 17a and the heat-conductive portion 13 are substantially L-shaped. It is to be understood, however, that the backup portion 17a is closely contacted by a horizontal portion 13a of the heat-conductive portion 13, not by a web portion 13b. Thus, the web portion 13b of the heat-conductive portion 13 is spaced away from a web portion 17b of the backup portion 17a.

FIG. 7 three-dimensionally illustrates the configurations of the backup portion 17a and the heat-conductive portion 13 of the movable hinge piece 17. It will be seen that circular holes 17c and 13c are respectively formed in the web portions 17b of the backup portion 17a and the web portion 13b of the heat-conductive portion 13. It is to be noted that the hole 17c has a diameter smaller than that of the hole 13c.

The construction of the connecting structure 30 will be described with reference to FIGS. 5 and 6.

The connecting structure 30 serves to mechanically connect the fixed hinge piece 11 and the movable hinge piece 17 while achieving conduction of heat between the conductive portion 12 of the fixed hinge piece and the conductive portion 13 of the movable hinge piece.

FIG. 7 illustrates the components of the connecting structure 30, including a spring washer 14, shaft 15, washers 16, 18, spring washer 19 and a stopper 20.

In order to provide required mechanical strength, the shaft 15 is made of a material such as iron. The shaft 15 has a main part 15c, a boss 15a projecting from one side of the main part 15c and a boss 15b projecting from the side of the main part 15c opposite to the boss 15a. The boss 15a extends through a hole 14a formed in the spring washer 14, a hole 13c in the conductive portion 13, a hole 12c in the conductive portion 12 and a hole 11c in the backup portion 11a. The boss 15a has substantially flat side surfaces 15e, 15e, so as to immovably and tightly fit in the hole 12c of the heat conductive portion 12 and the hole 11c in the backup portion 11. Thus, the boss 15a of the shaft 15 is securely fixed so as not to come off the hole 12c in the conductive portion 12a and the hole 11c of the backup portion 11a.

The spring washer 14 serves to press the conductive portion 12 of the fixed hinge piece 11 and the conductive portion 13 of the movable hinge piece 17 against each other, thereby holding these conductive portions 12 and 13 in close contact with each other. The spring washer 14 is made of, for example, a metallic material such as iron.

The washer 16 is held between the shaft 15 and the backup portion 17a of the movable hinge piece 17. The washer 16 has a hole 16c which has such a rectangular shape as to fit on the hub 15b of the shaft 15. The hub 15b of the shaft 15 also has flat side surfaces 15f, 15f. The hub 15b extends into close fit in a hole 20c of the stopper 20 past the hole 17c of the backup portion 17a, hole 18c of the washer 18 and a hole 19c in the spring washer 19. Thus, the hub 15b of the shaft 15 is securely held in the hole 20c of the stopper 20 so as not to come off the hole 20c in the stopper 20.

Consequently, as shown in FIGS. 5 and 6, the fixed hinge piece 11 and the movable hinge piece 17 of the hinge structure are connected to and united with each other through the shaft 15 having the hub 15a that closely fits in the hole 11c of the backup portion 11a and the hub 15b that closely fits in the hole 20c of the stopper 20. The movable hinge piece 17 therefore can pivot on the fixed hinge piece 11 as indicated by double-headed arrow R in FIG. 1.

The components of the connecting structure 30 including the shaft 15, washers 16, 18, spring washers 14, 19 and the stopper 20 can be made of a material having high mechanical strength, such as iron. The conductive portion 12 of the fixed hinge piece 11 may be fastened to the mounting surface of the main unit 2 of the computer 100 by means of the small screws 31, as shown in FIGS. 5 and 6. On the other hand, the conductive portion 13a of the movable hinge piece 17 can be secured to the mounting surface of the display unit 3 of the computer 100 by means of the small screws 32.

In the hinge 1A or 1B assembled as shown in FIGS. 5 and 6, the vertical web portion 12b of the conductive portion 12 of the fixed hinge piece 11 and the vertical web portion 13b of the conductive portion 13 of the movable hinge piece 17 are held in close contact with each other and pressed to each other by means of the spring washer 14. Consequently, the resistance to conduction of heat is minimized in the region of contact where the vertical web portions 12b, 13b of the conductive portions 12, 13 contact with each other.

Thus, the hinge 1A or 1B contributes to conduction and dissipation of heat, while providing mechanical strength. More specifically, the hinge 1A or 1B improves the conduction of heat between the main unit 2 and the display unit 3 of the computer 100, so as to facilitate and enhance movement of heat from the unit which produces heat at a greater rate, i.e., the main unit 2, to the unit which produces heat at a smaller rate, i.e., the display unit 3.

Thus, a greater area is available for dissipation of heat, a result of the enhanced heat conduction from the main unit 2 that produces heat at a greater rate to the display unit 3 which produces heat only at a small rate. Although the described arrangement affords a sufficient heat dissipation, the invention does not exclude provision of additional heat radiating means such as heat sinks on the conductive portions 12 and 13 of the hinge structure. Such additional heat radiating means further enhances the efficiency of heat dissipation.

For instance, the casings 2B and 3A of the main unit 2 and the display unit may be made of a light metal such as magnesium. Such casings provide outer frameworks that effectively function as heat sinks. A further improvement in the heat dissipation efficiency can be achieved when these outer frameworks are thermally connected to the conductive portions 12 and 13 shown in FIG. 6.

In general, materials having high heat conductivity exhibit high electrical conductivity, i.e., low electrical resistance. Therefore, in accordance with the present invention, the fixed hinge piece 11 and the movable hinge piece 17 of the hinge 1A can be electrically coupled to each other with reduced electrical resistance.

A description will now be given of a different form of the hinge structure incorporated in the electronic device of the present invention.

Figure 10:
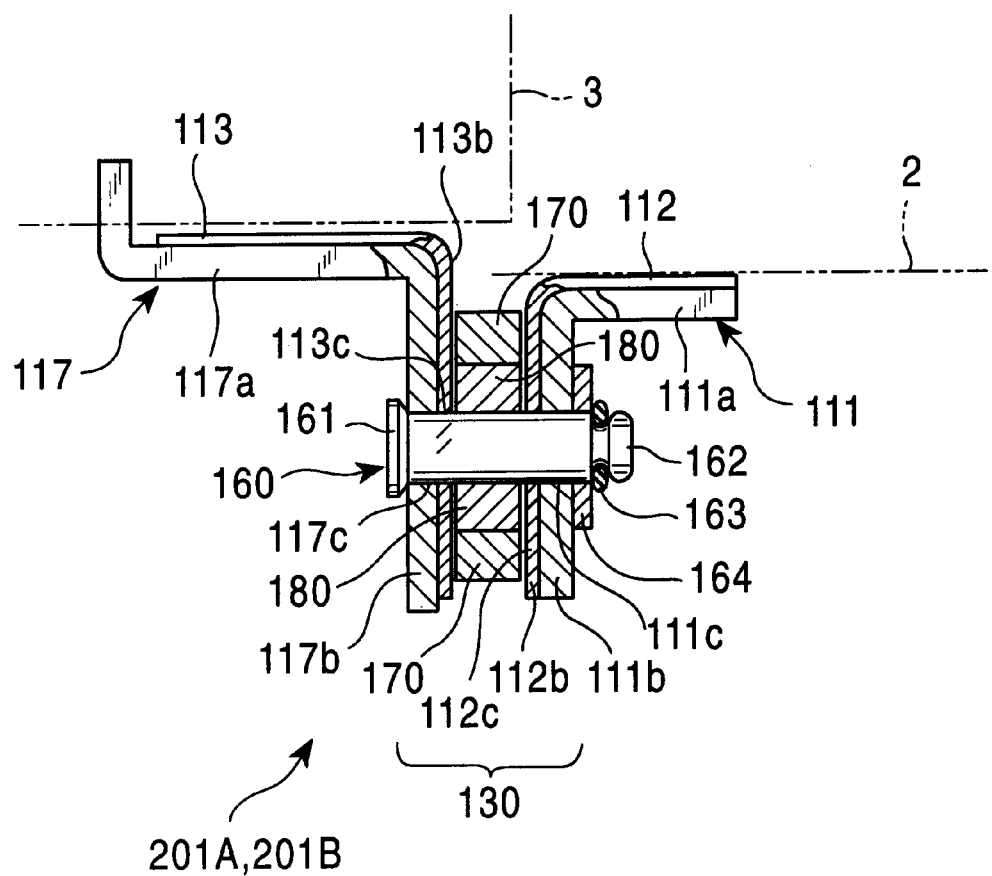
FIG. 10 is a side elevational view of another preferred form of the hinge structure used in the electronic device embodying the present invention.

FIG. 10 shows hinges 201A and 201B that can be substituted for the hinges 1A and 1B shown in FIG. 1. Thus, the hinges 201A and 201B can be used for connecting the main unit 2 and the display unit 3 of the computer 100 shown in FIG. 1.

The hinge 201A and/or the hinge 201B has a fixed hinge piece 111, a movable hinge piece 117 and a connecting structure 130.

The fixed hinge piece 111 is a part of the hinge that is fixed to the main unit 2, while the movable hinge piece 117 is a part that is fixed to the display unit 3.

The connecting structure 130 has a function to promote conduction of heat between the fixed hinge piece 111 and the movable hinge piece 117 while maintaining required mechanical strength of connection therebetween.

The fixed hinge piece 111 has a backup portion 111a and a heat conductive portion 112. The backup portion 111a is preferably made of a material having high mechanical strength such as an iron-based material, e.g., a stainless steel. The heat conductive portion 112 is preferably made of a material having high heat conductivity such as a copper-based material or an aluminum-based material. Each of the backup portion 111a and the conductive portion 112 is configured to have a substantially L-shaped section. The heat conductive portion 112 is held in close contact with the backup portion 111a.

The backup portion 111a has a vertical web portion 111b which is provided with a hole 111c formed therein, while the conductive portion 112 has a vertical web portion 112b provided with a hole 112c formed therein.

The movable hinge piece 117 also has a backup portion 117a and a heat conductive portion 113. The backup portion 117a is configured to have a substantially L-shaped section, and is preferably made of a material having high mechanical strength such as an iron-based material, e.g., a stainless steel. The heat conductive portion 113 also is configured to have a substantially L-shaped section, and is preferably made of a material having high heat conductivity such as a copper-based material or an aluminum-based material.

The backup portion 117a and the conductive portion 113 are held in close contact with each other. The backup portion 117a has a vertical web portion 117b provided with a hole 117c formed therein. The heat conductive portion 113 also has a vertical web portion 113b provided with a hole 113c formed therein.

A description will now be given of the connecting structure 130. The connecting structure 130 has a shaft 160, a heat conductive ring 170 and a torque bush 180. One end 161 of the shaft 160 is enlarged to have a diameter greater than that of the hole 117c of the backup portion 117a, thus serving as a stopper for preventing the shaft 160 from coming off. The other end 162 of the shaft 160 carries an "E" ring fitted therein. A washer 164 is interposed between the "E" ring 163 and the vertical web portion 111b. With this arrangement, the shaft 160 is secured so as not come off the backup portion 117a and so as not come off the backup portion 111a.

The torque bush 180 and the heat conductive ring 170 are disposed between the heat conductive portions 112 and 113. More specifically, the torque bush 180 and the heat conductive ring 170 are arranged coaxially about the axis of the shaft 160. The heat conductive ring 170 is a ring-shaped member that serves to conduct heat between the heat conductive portion 112 of the fixed hinge piece 111 and the heat conductive portion 113 of the movable hinge piece 117. Thus, the heat conductive ring 170 is preferably made of a material having high heat conductivity such as a copper-based material or an aluminum-based material.

The torque bush 180 is made of, for example, a resin material, and permits relative rotational motion between the fixed hinge piece 111 and the movable hinge piece 117.

The heat conductive portion 112 of the fixed hinge piece 111 is placed on the mounting surface of the main unit 2 and is secured thereto by means of, for example, small screws. The heat conductive portion 113 of the movable hinge piece 117 is placed on the mounting surface of the display unit 3 and is secured thereto by means of, for example, small screws.

The hinges 201A, 201B shown in FIG. 10 provide both the mechanical connecting function with required mechanical strength and heat conducting function, similarly to the hinges 1A and 1B described before in connection with FIGS. 5 to 9.

It is recalled that, in the hinges 1A, 1B of the type shown in FIGS. 5 to 9, the conduction of heat between the heat conductive portion 12 of the fixed hinge piece 11 and the heat conductive portion 13 of the movable hinge piece 17 is achieved through direct contact between these heat conductive portions 12 and 13. In contrast, in each of the hinges 201A and 201B shown in FIG. 10, the conduction of heat between the heat conductive portion 112 of the fixed hinge piece 111 and the heat conductive portion 113 of the movable hinge piece 117 is achieved through the intermediary of the separate heat conductive ring 170. Thus, in each of the hinges 201A and 201B, the heat conductive portion 112 and the heat conductive portion 113 do not contact each other, although they are arranged in close proximity of each other.

A discussion will now be made on data shown in FIG. 11 obtained through an experiment conducted on a hinge structure in accordance with the present invention, in comparison with experiment data shown in FIG. 12 obtained through an experiment conducted on a conventional hinge structure.

A hinge was prepared by using a fixed hinge piece and a movable hinge piece having heat conductive portions made of aluminum, and the heat conductive portion of the fixed hinge piece was heated while the changes of temperatures of the fixed and movable hinge pieces were measured over time. The results are shown in FIG. 11. A similar experiment was conducted by employing a conventional hinge structure. From a comparison between the data shown in FIG. 11 and that shown in FIG. 12, it will be seen that the hinge in accordance with the present invention exhibits a smaller temperature differential between the fixed hinge piece and the movable hinge piece than that shown by the conventional hinge structure. At the same time, temperature rise of the fixed hinge part due to accumulation of heat is smaller in the hinge structure of the invention than in the conventional hinge structure. This is attributable to the fact that the conduction of heat from the fixed hinge piece to the movable hinge piece is greater in the hinge structure in accordance with the invention than in the conventional hinge structure.

FIG. 13 shows, by way of example, heat conductive materials usable as the material of the heat conductive portions of the hinge structure in accordance with the invention, together with physical constants of these materials at 0° C.

Figure 14:
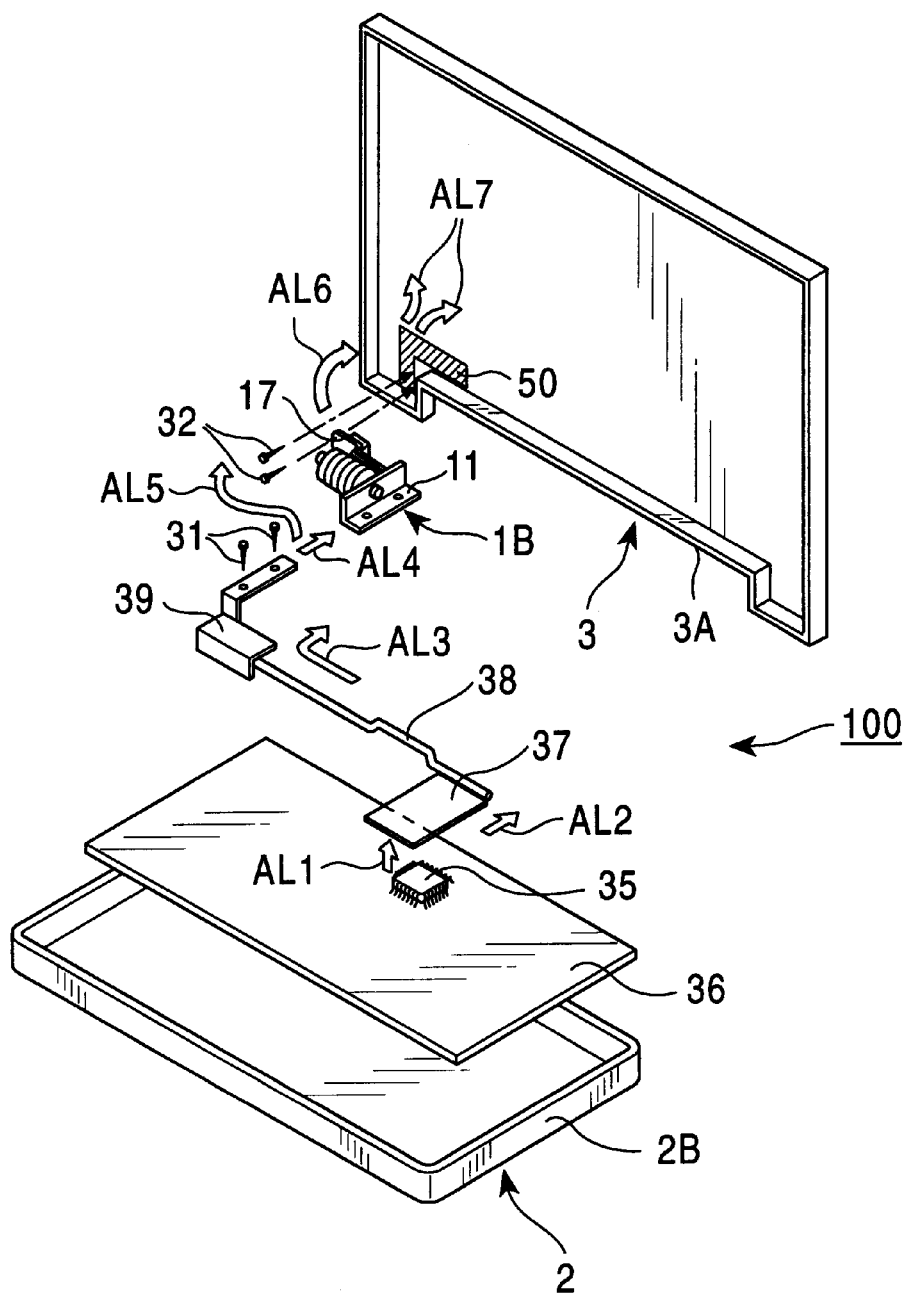
FIG. 14 is an illustration of another form of a heat-conduction system employed in the present invention.

FIG. 14 shows a modification of the embodiment described before in connection with FIG. 3. In this modification, the heat pipe and the heat receptacle plate employed in the embodiment of FIG. 3 are omitted. Omission of the heat pipe and the heat receptacle plate is permitted by virtue of the fact that the CPU 35 as a heat source is disposed near or in the close proximity of the hinge 1B.

It will be seen that the arrangement shown in FIG. 14 permits efficient conduction of heat generated by the CPU 35 to the casing 3A of the display unit 3 through the hinge 1B.

The casing 3A may be made of, for example, a metallic material having high heat conductivity. When such a casing material is used, the casing 3A in its entirety serves as a heat dissipater that dissipates heat. A magnesium alloy can suitably be used as the material of the casing 3A that functions as the heat dissipater.

Preferably, a magnesium-based metal such as AZ91D is used as the magnesium alloy. This magnesium alloy has a heat conductivity of 157 W/mK. The thickness of the sheet material constituting the casing 3A may be, for example, 1.2 mm. The length, breadth and the thickness of the casing 3A may be, for example, 259 mm, 208.6 mm and 23.9 mm. The CPU mounted in the main unit 2 may be, for example, the Pentium processor 133 MHz (tradename) of Intel Corporation. This CPU generates heat at a rate of 6 W per hour.

Figure 15:
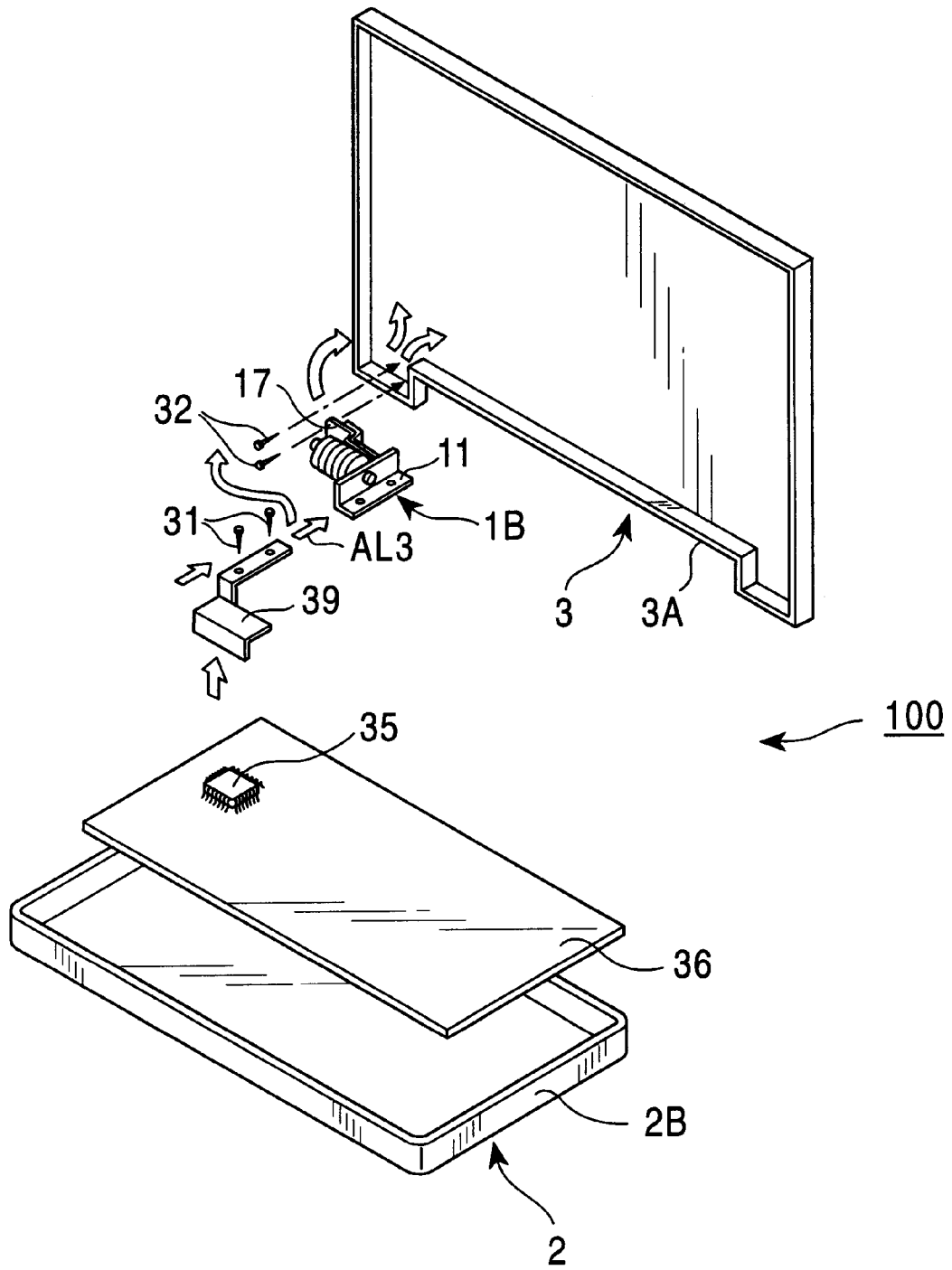
FIG. 15 is an illustration of still another form of a heat-conduction system employed in the present invention.

FIG. 15 shows a different embodiment that employs a heat diffusion member 50 disposed inside the casing 3A shown in FIG. 14. The heat diffusion member 50 is thermally coupled to the movable hinge piece 17 of the hinge 1B. In this embodiment, the casing 3A may be made of plastics that exhibit inferior heat conduction to metals, although a metallic material having superior heat radiation characteristic may also be used as the material of the casing 3A.

Thus, the present invention provides an electronic device having a foldable structure composed of blocks hinged to each other, such as a portable computer having a main block or unit (unit carrying a keyboard) and a display block or unit hinged to the main unit, wherein conduction of heat between these blocks is improved so as to facilitate movement of heat from the block that generates heat at a greater rate to the block that generates heat at a smaller rate, whereby a greater heat dissipation area becomes available. The invention does not exclude additional use of a heat sink or similar heat radiating means, so as to further enhance heat dissipation.

In general, the hinges constituting the foldable structure of an electronic device serve to pivotally secure the main unit and the display unit to each other, and provide a frictional resistance that serves to hold the display unit at a desired angular position relative to the main unit. According to the invention, the hinges are provided with additional functions of radiating heat therefrom and conducting heat therethrough from the unit that generates heat at a greater rate to the unit that generates heat at a smaller rate.

Each hinge has a fixed hinge piece, a movable hinge piece and a connecting structure interconnecting these hinge pieces. The hinges pivotally secure the fixed part (main unit) of a portable personal computer and the movable part (display unit) to each other while supporting these parts on each other with sufficiently large mechanical strength.

The fixed part, i.e., the main unit, of the personal computer generates heat at a rate greater than that in the display unit of the same. In particular, the CPU incorporated in the main unit generates heat at a large rate. The heat thus generated is absorbed by a heat-absorbing portion of the heat pipe that extends to a region near the hinge, where the heat is relieved from the heat pipe. The heat relieved from the heat pipe is then received by a heat conduction plate made of, for example, copper and is conducted to the hinge through this heat conduction plate. The heat conduction plate made of copper and the fixed hinge part of the hinge are secured together to the main unit by means of small screws, so that heat can be conducted from the heat conduction plate to the hinge with a sufficiently high rate of heat transfer.

The movable hinge piece of the hinge is secured together with a heat dissipation plate such as of copper to the movable part, i.e., the display unit, of the electronic device. As a consequence, the heat transmitted through the hinge is diffused through and dissipated from the heat dissipation plate.

In accordance with the invention, each of the casings of the main unit and the display unit may be integrally formed of a material that has both high heat dissipation effect and high mechanical strength, and may be pivotally connected to each other through hinges. Preferably, the hinge is so designed and configured as to provide as large area of contact as possible between the fixed side and the movable side of the hinge, whereby the whole electronic device can have a reduced thickness.

Although the CPU has been specifically mentioned as the source of heat, it will be clear that other components that produce heat, such as the power unit, may be associated with the hinge structure so that heat generated from such a heat source may efficiently be conducted to and dissipated from the display unit.

It is also to be noted that the present invention may be incorporated in various kinds of electronic devices that have hinged structures, although portable personal computers have been specifically mentioned in the foregoing description. Thus, the invention can effectively be used in electronic devices that need dissipation of heat generated therein, such as a portable information terminal, a portable phone, and a wireless transceiver.

The heat conductive portions of the fixed hinge piece and the movable hinge piece may be disposed in contact with either the surfaces of the main unit 2 and the display unit 3 that contribute to heat dissipation or the surfaces of the same that dissipate heat or, alternatively, both on such surfaces. The surface that contributes to heat dissipation is a portion of the circuit board in the main unit 2 or the display unit 3 intended for heat dissipation, while the surface that dissipates heat is the surfaces of a casing of the main unit 2 or of the display unit 3 made of a light metal such as magnesium.

As will be understood from the foregoing description, according to the present invention, it is possible to enhance dissipation of heat from an electronic device, without requiring increase in the size of the electronic device.

Although the invention has been described through its preferred forms, it is to be understood that the described embodiments are only illustrative and various changes and modifications may be imparted thereto without departing from the scope of the present invention that is limited solely by the appended claims.

What is claimed is:

1. An electronic device, comprising:

a display unit including a first part and a second part;

said first part containing a heat source;

said second part being connected to said first part and having a high heat conductivity and pivotal connecting means for mechanically and pivotally connecting said second part to said first part so as to allow said second part to pivot on said first part between a close position and an open position and for transmitting heat from said heat source to said second part, said pivotal connecting means being formed of a heat conductible hinge mechanism having a fixed hinge portion and a movable hinge portion which moves relative to said fixed hinge portion wherein both of said fixed and movable hinge portions have heat conductive portions and are in direct contact with one another; and wherein said first part has a heat pipe that conducts heat from said heat source to said heat conductive portions of said fixed and movable hinge portions of said heat conductible hinge mechanism such that heat is transmitted to said second part.

2. An electronic device according to claim 1, wherein said first part has a heat pipe that conducts heat from said heat source to said pivotal connecting means.

3. An electronic device according to claim 1, wherein said heat source is disposed in the vicinity of said pivotal connecting means.

4. An electronic device according to claim 1, wherein said second part has a heat diffusion member thermally connected to said pivotal connecting means.

5. An electronic device according to claim 4, wherein said second part has a casing, and said heat diffusion member is disposed in said casing.

6. An electronic device according to claim 4, wherein said second part has a metallic casing that serves as said heat diffusion member.

7. An electronic device according to claim 1, wherein said first part comprises a main unit of a portable computer and said second part comprises a display unit of said portable computer.

8. An electronic device according to claim 7, wherein said heat source includes at least one of a central processing unit and a power supply unit.

* * * * *